(12) United States Patent
Ullman et al.

(10) Patent No.: US 11,368,670 B2
(45) Date of Patent: Jun. 21, 2022

(54) AUGMENTED REALITY DISPLAY SYSTEM AND METHOD

(71) Applicant: YEDA RESEARCH AND DEVELOPMENT CO. LTD., Rehovot (IL)

(72) Inventors: Shimon Ullman, Rehovot (IL); Daniel Harari, Rehovot (IL); Liav Assif, Rehovot (IL); Igal Koifman, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 0 days.

(21) Appl. No.: 16/758,471

(22) PCT Filed: Oct. 25, 2018

(86) PCT No.: PCT/IL2018/051143
§ 371 (c)(1),
(2) Date: Apr. 23, 2020

(87) PCT Pub. No.: WO2019/082188
PCT Pub. Date: May 2, 2019

(65) Prior Publication Data
US 2020/0260068 A1 Aug. 13, 2020

Related U.S. Application Data

(60) Provisional application No. 62/577,332, filed on Oct. 26, 2017.

(51) Int. Cl.
*H04N 13/388* (2018.01)
*G02B 27/01* (2006.01)
(Continued)

(52) U.S. Cl.
CPC ......... *H04N 13/388* (2018.05); *G02B 27/017* (2013.01); *G06T 19/006* (2013.01);
(Continued)

(58) Field of Classification Search
None
See application file for complete search history.

(56) References Cited

U.S. PATENT DOCUMENTS 4,669,809 A   6/1987  Patry et al.
5,719,622 A   2/1998  Conway
(Continued)

FOREIGN PATENT DOCUMENTS

CN      206270499 U       6/2017
KR      10-2016-0022704   3/2016
WO      WO 2009/126125   10/2009

OTHER PUBLICATIONS

Narzt et al. "Augmented Reality Navigation Systems", 2005 (Year: 2005).*

(Continued)

*Primary Examiner* — Hilina K Demeter
(74) *Attorney, Agent, or Firm* — Mark S. Cohen; Pearl Cohen Zedek Latzer Baratz LLP (57) ABSTRACT

A multi-layer viewing system includes a stationary imager and a beam projector to project physical layer markings onto a region of an object. A headset includes an augmented reality display that is sufficiently transparent to enable a user who is wearing the headset to directly view the object through the display, and to display annotation that is superimposed on the object. A processor is configured to receive a selected location relative to the target for display of the annotation, determine an orientation of the augmented reality display by identifying images of markings in acquired images or markings on the object, calculate a display loca- (Continued)

tion for displaying the annotation on the augmented reality display such that the annotation is perceivable by the user as displayed at the selected position, and display the annotation at the calculated display location.

20 Claims, 5 Drawing Sheets (51) Int. Cl.
G06T 19/00 (2011.01)
G06V 20/20 (2022.01)
(52) U.S. Cl.
CPC ........ *G06V 20/20* (2022.01); *G02B 2027/014* (2013.01); *G02B 2027/0187* (2013.01)

(56) References Cited

U.S. PATENT DOCUMENTS

| 2002/0030637 | A1 | 3/2002 | Mann | |
|---|---|---|---|---|
| 2006/0028400 | A1* | 2/2006 | Lapstun | G02B 27/0093 345/8 |
| 2012/0194419 | A1* | 8/2012 | Osterhout | G02B 27/017 345/156 |
| 2012/0249797 | A1* | 10/2012 | Haddick | G04G 21/04 701/491 |
| 2012/0327187 | A1 | 12/2012 | Troy et al. | |
| 2013/0265330 | A1 | 10/2013 | Goto et al. | |
| 2015/0084990 | A1 | 3/2015 | Laor | |
| 2015/0234477 | A1* | 8/2015 | Abovitz | G06K 9/6201 382/103 |
| 2016/0283455 | A1 | 9/2016 | Mardanbegi et al. | |
| 2016/0292925 | A1 | 10/2016 | Montgomerie et al. | |
| 2016/0339652 | A1 | 11/2016 | Safai et al. | |
| 2016/0353055 | A1 | 12/2016 | Popescu et al. | |
| 2018/0122143 | A1* | 5/2018 | Ellwood, Jr. | G02B 5/30 |

OTHER PUBLICATIONS

International Search Report for PCT Application No. PCT/IL2018/051143 dated Jan. 17, 2010.

Kurata et al. "Remote collaboration using a shoulder-worn active camera/laser" In Eighth international symposium on wearable computers Oct. 31, 2004 (vol. 1, pp. 62-69). IEEE.

Okun MS, "Utilizing deep brain stimulation to treat human disease: changing abnormal brain" In Seventh IEEE International Symposium on Wearable Computers, 2003. Proceedings. Oct. 21, 2003 (pp. 2-2). IEEE.

Sakata et al. "WACL: Supporting Telecommunications Using Wearable Active Camera with Laser Pointer" In ISWC Oct. 21, 2003 (vol. 2003, p. 7th).

Kato, Hirokazu. (1999). An augmented reality system and its calibration based on marker tracking. TVRSJ, vol. 4, No. 4, pp. 607-616.

* cited by examiner

AUGMENTED REALITY DISPLAY SYSTEM AND METHOD

CROSS REFERENCE TO RELATED APPLICATIONS

This application is a National Phase Application of PCT International Application No. PCT/IL2018/051143, International Filing date Oct. 25, 2018, which claims the benefit of U.S. Provisional Application No. 62/577,332 filed Oct. 26, 2017, which is hereby incorporated by reference.

FIELD OF THE INVENTION

The present invention relates to multi-layer viewing system and method

BACKGROUND OF THE INVENTION

The maintenance, assembly, service, or operation of complex equipment or machinery often requires a collaboration between two human operators: a local operator who is located "on-site", that is, located physically near the equipment and can manually manipulate parts of the equipment, together with a remote operator who may be in a remote site, without the possibility of directly interacting with the equipment. The two operators may be of different level of expertise, such as an operator of a machine or piece of equipment, or a local technician repairing the equipment at the customer site, working together with an expert (e.g., at a remote site) who helps, guides, supervises and/or approves the operation. Alternatively, the two operators may be of equal level of expertise (possibly in complementary fields of expertise), performing a joint troubleshooting session (or brain storming) on a complex problem in the equipment.

For example, a technician (or on-site operator) may work to repair machinery whose failure has stopped production. The technician may try to conduct a troubleshooting and repair procedure but may require assistance from technical expert who is located in a remote call center. In another example, a local technician may need to perform a complex repair that requires approval by senior personnel. Prior to receiving such approval, the local technician may be required to demonstrate the fault, e.g., to a remote supervisor. In yet another example, a novice operator may need the remote guidance of an experienced operator, who is located at a different site.

Such joint maintenance and repair can currently be done using communication by images and video. The communication may enable the participants to share information, such as views of the equipment, auxiliary material such as diagrams and instructions, and verbal communication of explanations and guidance. For example, an on-site operator may send images of equipment to a remote expert. The remote expert may give the local operators verbal guidance and advice which may be accompanied by supporting material such as illustrations and photographs. Such guidance could be time consuming and difficult where there are linguistic or cultural differences between the local operator and the remote expert. In addition, ergonomic or other constraints, such as handling of video, audio, or pointing equipment, environmental factors as poor illumination, noise, or other factors may increase the difficulty of this process.

During such joint maintenance, repair, or operation, it is often very useful to enable a remote participant to mark a position on the equipment using online remote display video of the equipment, while the local participant can view this marking overlaid on the equipment. For example, a remote expert can mark a particular target (e.g., a knob, screw, switch, wire, or desired part), and instruct the on-site participant or operator to perform a particular operation on the target (e.g., turn a knob, open a screw, operate a switch, connect or disconnect a wire, or another operation). An augmented reality (AR) display (such as AR glasses, or another see-through AR display) may be used by the on-site participant while the remote expert produces a marking to designate a particular location on the equipment using video from an on-site camera (e.g. mounted on the AR goggles). The augmented reality system will then present to the on-site operator an image of the marking on an AR display, such that the marking is overlaid over the "real-world" target. For example, the remote expert may mark a knob, which is a part of the equipment and is to be turned in a particular direction. Using the AR system, the on-site technician may see on the display a marking overlaid over, or pointing towards, the knob in question, possibly with some description of the operation to be performed, such as the direction of turning the knob.

Such use of AR may require precise alignment between a marking that is displayed on the AR layer display and the position of the actual target equipment. The mark produced by the remote expert should appear to the on-site operator as overlaid over the target equipment and may be expected to point to the target, with high precision. Even a slight misalignment may cause the operation to be carried out on the wrong part of the equipment. In AR systems, obtaining such alignment with high precision requires complex procedures that typically take into account the precise location of the AR display relative to the equipment, and the relative location of the AR display relative to the user's eyes and/or pupils. Such precision alignment may require complex calibration procedures, and the precision of the alignment may deteriorate over time.

SUMMARY OF THE INVENTION

There is thus provided, in accordance with an embodiment of the invention, a multi-layer viewing system including: a stationary imager configured to acquire images with a field of view that includes a target object; a beam projector controllable to project one or more physical layer markings onto a target region of the target object; a headset including an augmented reality display and a scene imager configured to acquire scene images of a region in front of the augmented reality display or a headset beam projector configured to project a headset beam in front of the augmented reality display, the augmented reality display sufficiently transparent to enable a local user who is wearing the headset to directly view the target object through the augmented reality display and configured to display annotation that is superimposed on the directly viewed target object so as to be visible to the local user; and a processor, configured to: receive a selected location relative to the target region for display of the annotation; determine an orientation of the augmented reality display by identifying images of the one or more physical layer markings in the scene images, or by identifying images of the one or more physical layer markings and of a mark that is formed by the headset beam in an image that is acquired by the stationary imager; calculate a display position location for displaying the annotation on the augmented reality display such that the annotation is perceivable by the local user as displayed at the selected location position relative to the target region; and display the annotation on the augmented reality display at the calculated display location.

Furthermore, in accordance with an embodiment of the invention, the beam projector is controllable by operation of a user control.

Furthermore, in accordance with an embodiment of the invention, the user control enables a remote user to control the beam projector by indication of the target region on an image of the target object that is acquired by the stationary imager.

Furthermore, in accordance with an embodiment of the invention, a user control is configured to enable input of the selected location by indication of the selected location on an image of the target object that is acquired by the stationary imager.

Furthermore, in accordance with an embodiment of the invention, the beam projector includes a laser.

Furthermore, in accordance with an embodiment of the invention, the beam projector is configured to project a physical layer marking in the form of a pattern.

Furthermore, in accordance with an embodiment of the invention, a field of view of the stationary imager is sufficiently large to fully cover at least a region of target object onto which a physical layer marking may be projected by the beam projector larger than and includes a field of view of the scene imager.

Furthermore, in accordance with an embodiment of the invention, the beam projector is further configured to scan the one or more physical layer markings over a surface of the target object.

Furthermore, in accordance with an embodiment of the invention, the processor is further configured to calculate a tilt angle of the surface.

Furthermore, in accordance with an embodiment of the invention, the system includes a remote station.

Furthermore, in accordance with an embodiment of the invention, the remote station includes a remote display and user controls.

Furthermore, in accordance with an embodiment of the invention, the stationary imager and the beam projector are incorporated into a single stationary unit.

Furthermore, in accordance with an embodiment of the invention, the system includes at least one additional imager or at least one additional projector.

Furthermore, in accordance with an embodiment of the invention, the processor is further configured to operate the at least one additional imager to acquire an image of a region of the target object that is identified as not visible to the stationary imager, or to operate the at least one additional projector to project a marking on a region of the target object that is identified as not accessible to a beam that is emitted by the beam projector.

There is further provided, in accordance with an embodiment of the invention, a method of operation of a viewing system that includes a stationary imager, a beam projector, and a headset including an augmented reality display and a scene imager configured to acquire scene images of a region in front of the augmented reality display or a headset beam projector configured to project a headset beam in front of the augmented reality display, the augmented reality display sufficiently transparent to enable a local user who is wearing the headset to directly view the target object through the augmented reality display and configured to display annotation that is visible superimposed on the directly viewed target object, the method including: acquiring using the scene imager a scene image of the target object when one or more physical layer markings are projected onto a target region of the target object by the beam projector, or using the stationary imager an image that includes the one or more physical layer markings and a mark that is formed by the headset beam; receiving a selected location relative to the target region for display of the annotation; identifying in the acquired scene image an image of the one or more physical layer markings or an image of the one or more physical layer markings and an image of the mark that is formed by the headset beam; calculating a display position location for displaying the annotation on the augmented reality display such that the annotation is perceivable by the local user as displayed at the selected position relative to the target region; and displaying the annotation on the augmented reality display at the calculated display location.

Furthermore, in accordance with an embodiment of the invention, acquiring the scene image of the target object includes acquiring a plurality of the scene images successively when a physical layer marking of the one or more physical layer markings is scanned across a surface of the target object.

Furthermore, in accordance with an embodiment of the invention, the method includes calculating a tilt angle of the surface by identifying a location of the image of the scanned physical layer marking within the successively acquired scene images.

Furthermore, in accordance with an embodiment of the invention, acquiring using the scene imager is preceded by execution of a registration calibration procedure.

Furthermore, in accordance with an embodiment of the invention, the registration calibration procedure includes operating the beam projector to project one or more calibration physical layer markings onto the target object.

Furthermore, in accordance with an embodiment of the invention, the registration calibration procedure further includes displaying calibration annotation on the augmented reality display such that the annotation is visible to a user of the headset who is looking at a marking of the one or more calibration physical layer markings as superimposed on that marking.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In accordance with an embodiment of the present invention, a multi-layer augmented reality (AR) system is configured to enable a remote user to mark a target location and to add additional information related to the target object which may be visible to the local user via a see-through augmented reality display. The information may include physical layer marking directly on the target object (e.g., via a projected beam of light), and a "virtual layer" that includes annotation or other marking (all such marking being referred to herein as annotation) that is displayed on the augmented reality display and that may be seen by the local user as superimposed on a direct view of the target object that is viewed via the AR display (e.g., AR goggles or another head-up display).

The remote user may be located at a remote site where the remote user cannot have direct physical access to the target object (e.g., in another building, city, country, or elsewhere), regardless of an actual physical distance of the remote site from the target object (e.g., may be nearby in an adjoining room or even at separate location within the same room as the target object).

A target object may include, for example, equipment, workpiece, human or animal body, plant, sample (e.g., biological, chemical, geological, or other type of sample), or other target object which may be marked by a remote user for viewing by a local user. The local user typically is located at the site of the target equipment so as to have direct access (e.g., either via direct physical contact or using a tool) to the target object.

The multi-layer viewing system includes at least one stationary imager which provides image of target area to the remote viewer (e.g., pan-tilt-zoom camera, web camera, or other type of camera), a remotely controlled projector capable of projecting physical layer marks and/or images, an augmented reality display typically including an augmented reality projector to project images on a see-trough display (e.g., AR goggles, head-up display, or other see-through display) that is located between the eyes of the local user and the target object, and a processor that is configured to align information that is displayed by the augmented reality display with the target object and to control the movement of the projector.

Typically, the system may include one or more stationary units that each includes one or more imagers (each referred to herein as stationary imagers) and projectors. Each unit typically includes a controller (e.g., that includes one or more of a processor, a communications link to a processor, control circuitry, or other controller components). The field of view of each stationary imager is typically sufficiently large to fully cover the region of space that includes the target object and that may be marked by at least one beam projector. The controller of the unit may be configured to coordinate between operation of the beam projector and the stationary imager in a closed loop using images from a stationary imager of the unit.

Typically, the system includes a head-mounted headset unit (that includes an augmented reality display and) that typically includes a scene imager that is configured to image a scene that is directly in front of the local user (in the gaze direction). In some cases, the headset may include a beam projector (e.g., either in addition to, or instead of a scene imager) that is configured to project a beam directly in front of the headset (e.g., in the gaze direction).

Each stationary unit is located in the vicinity of the target so as to image and project to at least part of the target. When more than one stationary unit is included, an optimum setup may include placement of the various stationary units such that different stationary imagers view the target object from different directions (and to project beams on the target object from different directions). Thus, a section of the target object to which there is no direct line of sight to one stationary unit may be covered by an additional stationary unit at another location. Typically, at least one stationary unit is mounted at a fixed (e.g., remaining in place unless moved) location, e.g., on a tripod or stand, placed on a table, cart, or other piece of furniture, on a shelf, ledge or other fixed structure, mounted to a wall, ceiling, or a mountable stationary part of the target, or otherwise mounted onto a structure that cannot move autonomously. One or more additional stationary units may be mounted on a part of the body (e.g., shoulder, torso, arm, or other part) of the local user or of another person.

An imager (stationary or head-mounted) may include, for example, a video camera, a camera that is configured to acquire successive images, or another type of imaging device. The imager may be configured to acquire visible images, infrared images, or images in another spectral range. In some examples, the imager may include a binocular pair or other combination of two or more imagers.

The multi-layer viewing system may also include a head-mounted imager (referred to herein as a "scene imager") that is worn on the head of a local user who is located near the target. Typically, the head-mounted imager is configured to acquire images of a field of view that is in front of the head of the local user. Thus, the field of view of the head-mounted imager may change as the head of the local user is turned. The field of view of the head-mounted imager may approximate the current field of view that is viewed at any given movement by the local user. However, since the current field of view is also determined by the direction in which the eyes of the local user are directed relative to the local user's head, the current field of view may not coincide exactly with the field of view of the head-mounted imager. Typically, the field of view of the head-mounted imager is sufficiently large so as to encompass the current field of view regardless of the orientation of the local user's eyes.

As used herein, a camera is considered to be stationary when mounted on a fixture that does not move together with a local user or other person at the site of the target. An imager that is mounted on a rotatable or translatable mount that is movable independently of motion of the local user is also considered to be stationary.

The remote user may operate a remote station of the multi-layer viewing system. For example, the remote station may include a remote display via which the remote user may view images that are acquired by one or more of the stationary imagers, head-mounted imagers, or both. The remote station includes one or more controls that enable the remote user to indicate a region of an image of the target, or indicate position on the target in fixed coordinates, for marking for viewing by the local user. The controls may enable the remote user to add annotation or otherwise add information to be marked.

The multi-layer viewing system includes a projector for projecting one or more markings directly onto a target region of the target object. Such marking is referred to herein as physical layer marking. For example, the projector may include a laser, or another illumination device that is capable of projecting a beam of light onto the target object. The projected beam may include visible light, or may include nonvisible light (e.g., infrared) that may be viewed by the local user via the head-mounted imager (and augmented reality display described below). In some examples, the projector may be configured to be rapidly scanned in a raster pattern or other pattern. (As used herein, rapid scanning refers to scanning at such a rate that a complete scan beam with the pattern is perceived by a viewer, due to persistence of vision, as a steady display of stationary forms). In some such examples, the beam may be scanning in a pattern that outlines or otherwise provides one- or two-dimensional outlining or other indication of the target region. In some such examples, the intensity of the projected beam may modulated in tandem with the scanning of the beam so as to illuminate the target region or to form more complex marking (e.g., with annotation, or otherwise more complex than a simple outline of the region, to discriminate the target region from other regions in the field of view).

In some examples, the projector may be operated by the remote user (e.g., to provide guidance to the local user or to clarify a query to the local user). In some examples, the projector may be operated by either the remote user or the local user (e.g., for use in drawing the attention of the remote user to a marked location). In some examples, separate projectors may be provided for operation by the local user and the remote user. In some examples, the beams created by two or more different projectors may be distinguishable from one another by their colors, spot shapes, or otherwise.

The local user is provided with an augmented reality display. Typically, the augmented reality display is worn on the local user's head, and may be part of a single head-mounted unit with the head-mounted imager. The augmented reality display is configured to display an image that is viewed by the local user as superimposed on the scene that is viewed by the local user's eyes. Typically, the augmented reality display includes transparent or semitransparent goggles through which the local user may directly view (via a direct line of sight via optics only, without any intervening conversion of light to an electronic signal) the target object (or any other scene) and onto which additional marking (e.g., in the form of alphanumeric text, symbols, outlining, highlighting, or other marking) may be projected or otherwise displayed without completely obscuring the local user's direct view of the target object. Such marking is referred to herein as augmented reality layer marking.

A processor of the multi-layer viewing system (e.g., that is incorporated into the augmented reality display or elsewhere) may be configured to align any information that is displayed on the augmented reality display with the target object. For example, the annotation may include an identification of a target region or component of the target object, displayed instructions or symbols (e.g., indicating a direction of motion or rotation) regarding examination of or operations on an object in the target region (e.g., rotation of an object such as a knob or bolt, applying force to an object, opening a cover, applying lubrication or other substance, applying a surgical or other medical procedure, sampling, or other modification or operation), color coding of components of the target object, or other annotation. The alignment may ensure that the annotation is located on the augmented reality display at the intended location as viewed by the local user.

For example, the processor may be configured to utilize physical layer marking of the target object with an image that is acquired by the head-mounted imager to achieve the intended alignment. For example, the physical layer marking may be controlled by a user to mark a particular target location on the target object. Typically, the remote user may select a location on a remotely displayed image that was acquired by the stationary imager. The remote user may, on the same display, indicate locations where particular annotations that are to be displayed on the augmented reality display. Typically, the multi-layer viewing system may apply known techniques (e.g., image processing techniques) to determine the location of the field of view of the head-mounted imager within the typically larger field of view of the stationary imager. The processor may be configured to apply image processing techniques to identify an image of the physical layer marking that is acquired by the head-mounted imager. The processor may then be configured to apply the annotation to the augmented reality layer at a location relative to the imaged physical layer marking (e.g., as indicated by a user on a display of the field of view of the stationary imager). Thus, the displayed annotation will be displayed at an intended location relative to the physical layer marking, and thus to the target object.

Alternatively or in addition, a headset projector that is coupled to the headset with the augmented reality display may project a beam that indicates an orientation of the headset. The beam that is projected by the headset projector may mark the target object (physical) with an additional headset marking. The location of the headset marking relative to the physical layer marking that is projected by the (stationary) beam projector, e.g., as imaged by the stationary imager, may be indicative of an orientation of the headset relative to one or more stationary objects (e.g., target object or stationary imager). For example, the headset marking may be distinguishable in an acquired image from the physical layer marking by its color, shape, polarization, or other characteristic.

It may be noted that the accuracy of the alignment between the annotation and the physical layer marking may be continuously adjusted in order to compensate for eye rotation relative to the AR display. For example, during an initial calibration procedure, e.g., prior to beginning work on the target object, an alignment between the gaze direction of the eyes of the local user and the physical layer marking may be determined. For example, the local user may be requested to look at and face a physical layer marking while looking straight ahead (e.g., with eyes looking directly ahead of the face) at the marking. Concurrently, the augmented reality display may be operated to display annotation in the form of a mark. The location of the annotation mark may be adjusted (e.g., by a control operated by the local user or via communication with a remote user) until the annotation mark is viewed by the local user as coinciding with the physical layer marking.

Alternatively or in addition, the local user may be requested to face the target object as physical layer markings are projected at different locations on the target object (e.g., a point at the center and at edges of the target object), e.g., while the local user's face and headset remain stationary. The position of the marking on the target object (e.g., in an image acquired by the stationary imager) and in the image acquired by the head-mounted scene imager may be analyzed to yield a transformation from a coordinate system that is fixed with respect to the target object (stationary coordinates, e.g., as defined with respect to a global or local coordinate system) and a movable coordinate system that is defined relative to the head-mounted scene imager.

Increasing the number of points in the physical layer marking that are viewed during the initial alignment calibration, or the separation between points of the physical layer marking, may result in increased accuracy of the initial alignment calibration.

After the initial alignment, the system may continue to adjust placement of annotation in accordance with a calculated orientation of the eyes of the local user. For example, annotation may be intended to be displayed so as to be visible as superimposed on a target region of the target object that is marked by the physical layer marking. It may be assumed that the local user is currently looking at the physical layer marking (e.g., so that the annotation is assumed to be of use to the local user).

For example, standard image analysis techniques may be applied to identify the orientation of the field of view of the head-mounted scene imager, and thus of the headset (e.g., relative to the target object). Alternatively or in addition, when the head-mounted unit includes a beam projector, the imaged position of a mark that is projected by the head-mounted projector may enable determination of the headset orientation. (In some cases, determination of the headset orientation of the using a headset-mounted beam projector may be facilitated by an additional imager that is mounted on the local user's body.)

After the orientation of the of the headset and the augmented reality display are determined, any angular separation between the imaged position of the physical layer marking (at which the local user is assumed to be looking) and the orientation of the head-mounted scene imager may be assumed to be equal to a rotation of the local user's eyes relative to the head-mounted scene imager. Annotation that is displayed on the augmented reality display may be displaced accordingly. For example, the annotation may be displayed at a position where, based on the initial alignment calibration, it is calculated that the physical layer marking will appear to the local user via the augmented reality display.

Such alignment between the physical layer marking and the augmented reality layer annotation may be advantageous over other techniques. In addition, such alignment may avoid the complexity of eye pupil tracking or other techniques for achieving such alignment.

In some cases, the processor may be configured to map the coordinates of the physical layer marking on the target object (as measured in the field of view of the stationary imager) relative to a beam projector coordinates for each target region. This may enable fast open loop movement of the physical layer marking to new position on the target object.

In addition, the processor may be configured to use this marker position map to selectively illuminate or outline a component or region of the target object that is defined by a remote user or obtained from an image of the target object (which is aligned to imager field of view). The speed of travel of the projector spot on the physical layer marking area within successively acquired image frames may be interpreted to yield an orientation of the surface of the target object relative to the image plane (or normal to the image plane) or of the projector. Such knowledge of the orientation may be utilized to further increase accuracy of placement of physical layer markings, or in guiding a user to a part of the target object that is not currently visible to the imager. In some cases, the processor may be configured to play audio content (e.g., verbal explanations), or other non-visual content, when the processor determines that the headset is facing the test object, the physical layer marking, or another particular region.

Figure 1:
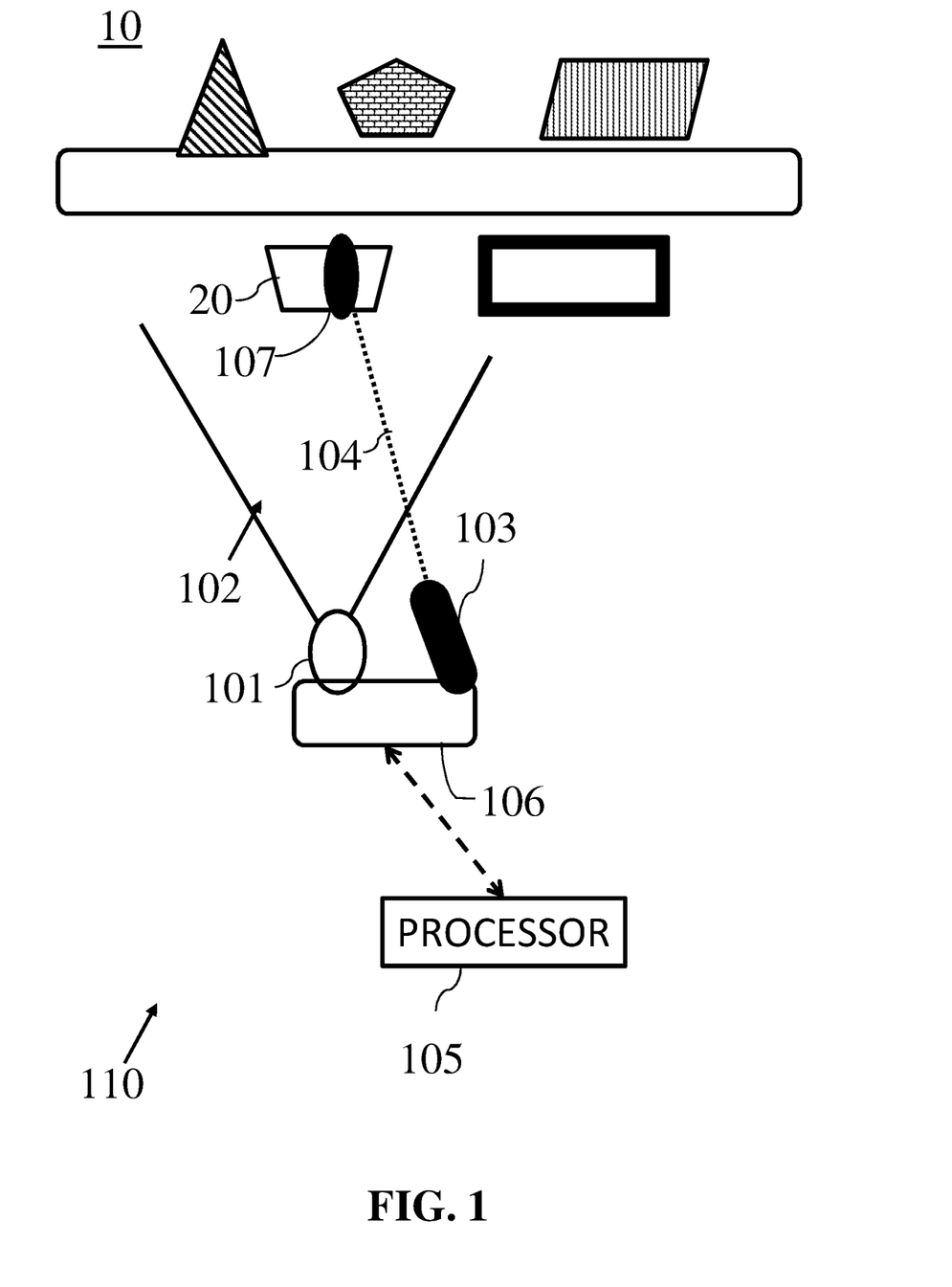
FIG. 1 schematically illustrates a multi-layer viewing system with a wearable headset.

FIG. 1 schematically illustrates a multi-layer viewing system with a wearable headset. Multi-layer viewing system 110 may allow synchronized target localization for at least one user who is operating target object 10.

In some examples, at least one of the participants (e.g., a local or remote user participating in the maintenance of target object 10) may be replaced by a computerized system. For example, the computerized system may receive an image of the scene, determine a location on target object 10 to be marked, e.g., by applying image processing techniques, and mark this location for viewing by a human user. In some examples, a human user may be a local user who is on-site to manually operate on target object 10 with assistance of target localization that is generated by a computerized system of multi-layer viewing system 110. In some examples, a human user may be a remote user who is remote to target object 10 and who may remotely operate thereon with assistance of target localization from an on-site computerized system having a camera for transmitting images of target object 10 (e.g., with the remote user remotely manipulating robotic arms).

In some examples, at least one participant or user may be a local user who is physically on-site or in the vicinity of target object 10, with the intention of performing an operation on target region 20 of target object 10 (e.g., to replace a component of a circuit board, or to perform other repairs or maintenance). The local user may be equipped with at least one imager 101 (e.g., a video camera) having a field of view 102. In some examples, imager 101 may be configured to capture images with a field of view 102 that includes the target region 20. In some examples, imager 101 may be wearable (e.g., on the head) by the local user such that the field of view 102 may correspond to the actual field of view of the eyes of the local user who is manually operating the target object 10.

In some examples, the local user may also be equipped with at least one directional illumination source 103 (e.g., a laser source or other beam source), configured to emit beam 104 to indicate the target region 20 with physical layer marking 107. In some examples, directional illumination source 103 may be wearable by the local user such that beam 104 may correspond to direction of head (e.g., direction of gaze) of the local user. Thus, physical layer marking 107 may indicate to other (e.g., remote) users the point of gaze of the local user on target object 10.

In some examples, imager 101 and/or directional illumination source 103 may be moveable and/or controlled by the user (local or remote) so as to properly align with target region 20.

In some examples, multi-layer viewing system 110 may include at least one processor 105, configured to receive signals from imager 101 and to control directional illumination source 103. In some examples, movement of imager 101 and/or directional illumination source 103 may be controlled by processor 105. In some examples, communication between processor 105 and imager 101 and directional illumination source 103 may be at least partially wireless (e.g., via Wi-Fi and/or Bluetooth).

Headset 106 may be worn by a local user. Headset 106 may include at least imager 101 with field of view aligned to the local user's normal field of view (e.g., when the user's eyes are looking straight ahead of the user's face, with pupils in a central position) that may provide indication to other users of the gaze of the local user. Headset 106 may also include directional illumination source 103 (e.g., fixed to the headset), such that movement of the head of the user may cause corresponding movement of the headset 106, thus enabling the local user to aim beam 104 so as to place physical layer marking 107 on target region 20. Directional illumination source 103 may also be movable and controllable by both the remote and local users.

In some examples, processor 105 may be embedded into the headset 106. In some examples, headset 106 may include a communication module for communication (e.g., wirelessly) with other devices. In some examples, at least one of imager 101 and directional illumination source 103 may be moved separately from the headset 106.

Figure 2A:
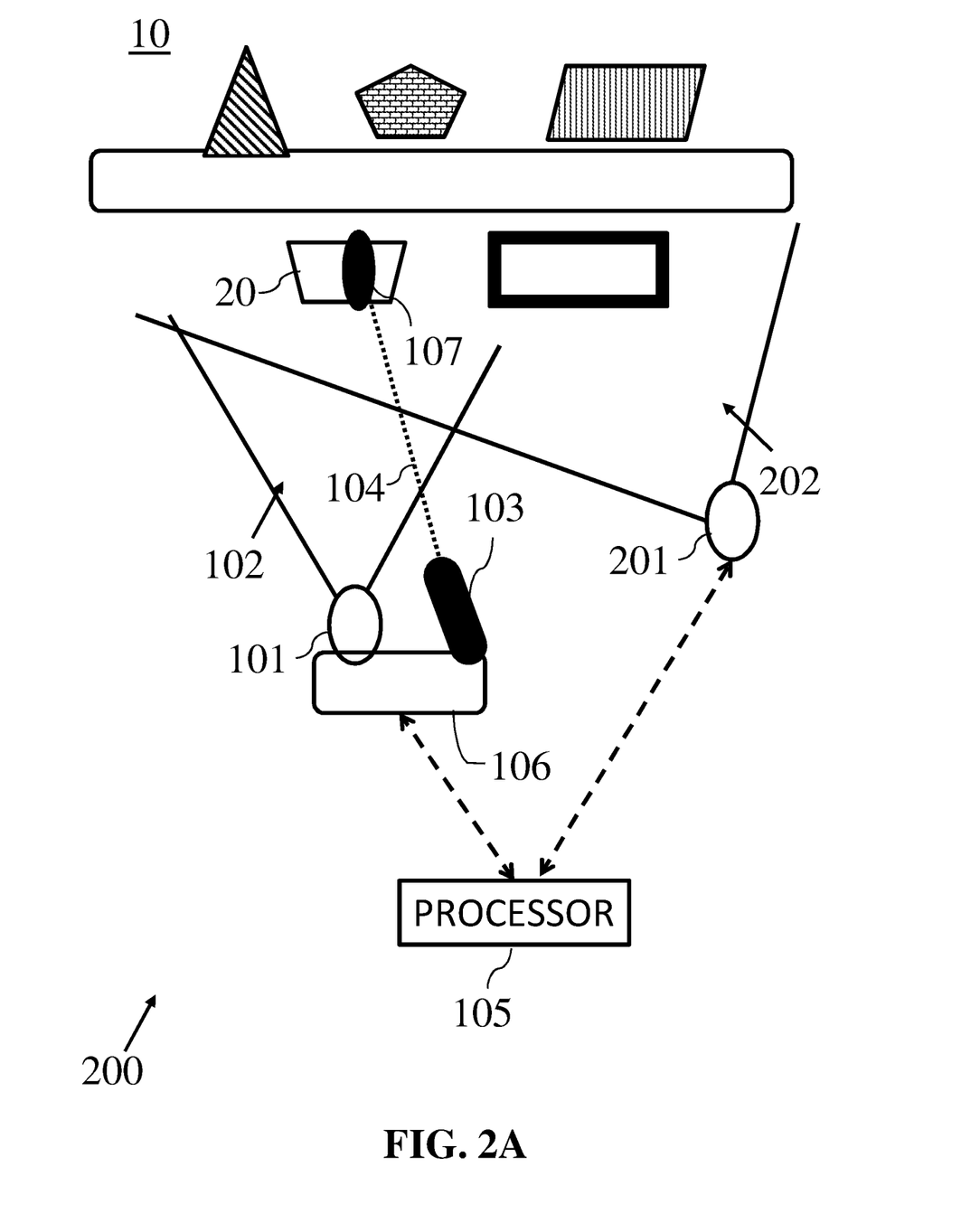
FIG. 2A schematically illustrates a multi-layer viewing system with a stationary imager 201.

FIG. 2A schematically illustrates a multi-layer viewing system 200 with a stationary imager 201. Stationary imager 201 may be controlled and/or moved by a remote user assisting the local user who is operating the target object 10. In some examples, stationary imager 201 may communicate with the processor 105 and/or with a remote server. For example, the imager 101 may be directed towards target region 20 with a first field of view 102, and the stationary imager 201 may be directed towards target region 20 from a different position with a field of view 202 (e.g., a wider field of view than field of view 102). For example, the remote user operating the stationary imager 201 may observe additional elements at target object 10 that are currently not visible to the local user. As another example, the remote user may correct alignment of beam 104 so as to precisely apply physical layer marking 107 to target region 20 for instance, via audio communication with the local user (e.g., via a dedicated speaker at headset 106) and thus direct the local user's movements.

In some examples, stationary imager 201 may enable better (e.g., wider field, more stable, or otherwise preferable) viewing of target object 10 or target region 20 at times when the local operator is blocking the view of target 10 by imager 101. For example, the remote user may use stationary imager 201 to view target object 10 from a different viewing angle. In some examples, the remote user may concurrently receive images from both imager 101 and stationary imager 201. In some examples, different imagers of multi-layer viewing system 200 may acquire images in different spectral bands, for instance, one in visible light and one in infrared. In some examples, an imager of multi-layer viewing system 200 may be configured to detect a gaze detection to determine the direction of gaze of the local user, and, for instance, accordingly direct directional illumination source 103.

In some examples, at least one imager of the multi-layer viewing system may be equipped with additional illumination units to illuminate sections in target object 10 that are not illuminated by ambient lighting.

Figure 2B:
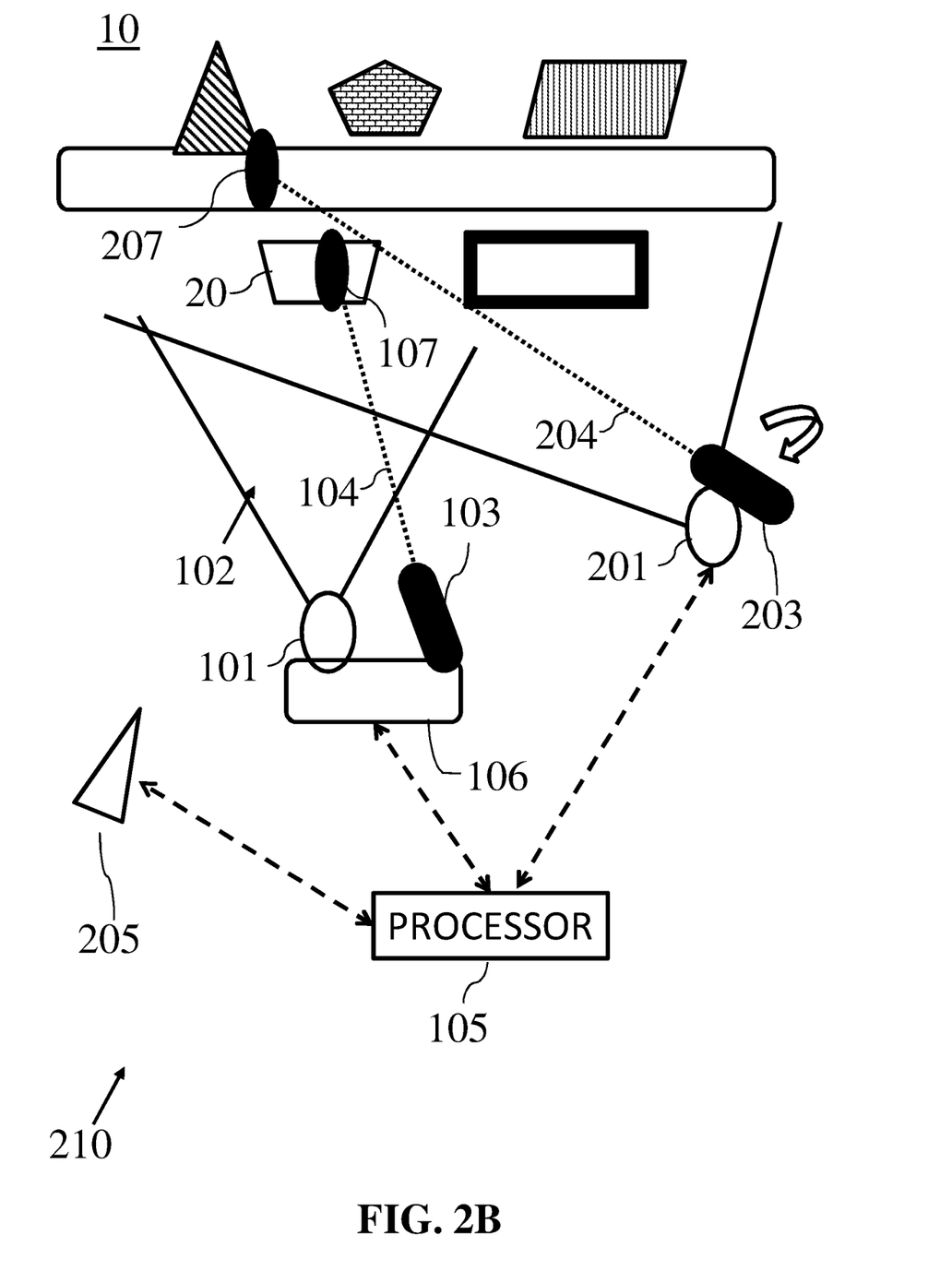
FIG. 2B schematically illustrates a multi-layer viewing system with a second directional illumination source.

FIG. 2B schematically illustrates a multi-layer viewing system 210 with a second directional illumination source 203. Second directional illumination source 203 may be controlled (e.g., rotated or translated) by a remote user assisting the local user who is operating the target object 10. For example, the remote user may control second directional illumination source 203 to aim second beam 204 so as to apply second physical layer marking 207 at a particular point on target object 10. As another example, the remote user may apply second physical layer marking 207 to indicate that a current target region 20 that is indicated by physical layer marking 107 is in error and to indicate a correct target region 20.

In some examples, second directional illumination source 203 may be physically displaced and separately controllable (e.g., by processor 105) from the stationary imager 201.

For example, second directional illumination source 203 may be a laser pointer and create a visible illumination (second physical layer marking 207) at a point where the directed light beam 204 from the laser pointer 203 impinges on a surface of target object 10. Second physical layer marking 207 may be visible to other users or participants. It should be appreciated that in contrast to methods where the marking is only virtual (e.g., using augmented reality devices); such physical marking allows precise localization of the target element 20.

In some examples, second directional illumination source 203 may emit the second beam 204 having a different color than that of beam 104 so as to allow visible differentiation between the beams. It should be noted that while one or two imagers and directional illumination sources are shown in the figures, any number of elements may be possible. For example, the multi-layer viewing system may include second and third imagers and second and third directional illumination sources controlled by two remote users, such that each beam emitted from the directional illumination sources may have a different color.

According to some examples, the direction of at least one imager or directional illumination source relative to a predefined position may be sensed in order to determine the direction of gaze of the corresponding user (or operator). In some examples, the initial position of each imager or directional illumination source may be predefined such that any movement may be compared to the initial position. In some examples, the orientation or positioning of each imager or directional illumination source may be determined by Global Positioning System (GPS) devices, accelerometers, gyroscopes, or other position or orientation sensors.

According to some examples, at least two directional illumination sources may simultaneously emit beams towards a single point on target object 10. In this manner, the effects of reflections from smooth surfaces may be accounted for. For example, two directional illumination sources 103 may be located at different positions and emit beams 104 toward a single location. In some examples, sensed orientations of such multiple directional illumination sources may enable precise alignment among the fields of view of multiple imagers, thus enabling combination of several frames using image registration.

According to some examples, multi-layer viewing system 210 may include at least one projector 205, coupled to processor 105 and configured to project at least one symbol (or pattern) onto target object 10 to be visible by the participants. For example, projector 205 may project instructions for turning a specific knob near the target region 20. In some examples', at least one projector 205 may be embedded into at least one directional illumination source. In some examples, the projections may be displayed on a headset.

In some examples, an image that is acquired by an imager of the multi-layer viewing system 210 may be stored in a memory unit in communication with processor 105 for future processing. For example, participants in the operation on target object 10 may compare a current view of target 10 with previously acquired images.

In some examples, an imager or directional illumination source may be attached to parts of target object 10, mounted to body parts of the local user, or positioned near target object 10 using mounting devices such as tripods or flex arms. In some examples, each type of manipulation of target object 10 or each region of target object 10 may be associated with locations that have previously been determined to be advantageous for placement of an imager or directional illumination source.

In some examples, the remote user may guide the local user to perform a manipulation on a specific part of target object 10 and which is not currently visible to the local user. In such examples, the remote user operate second directional illumination source 203 to provide a second physical layer marking 207 that indicates a general direction to enable the local user to locate that part. The remote user may view a wide angle view of the equipment site to facilitate guidance of the local user to the part of interest.

Figure 3:
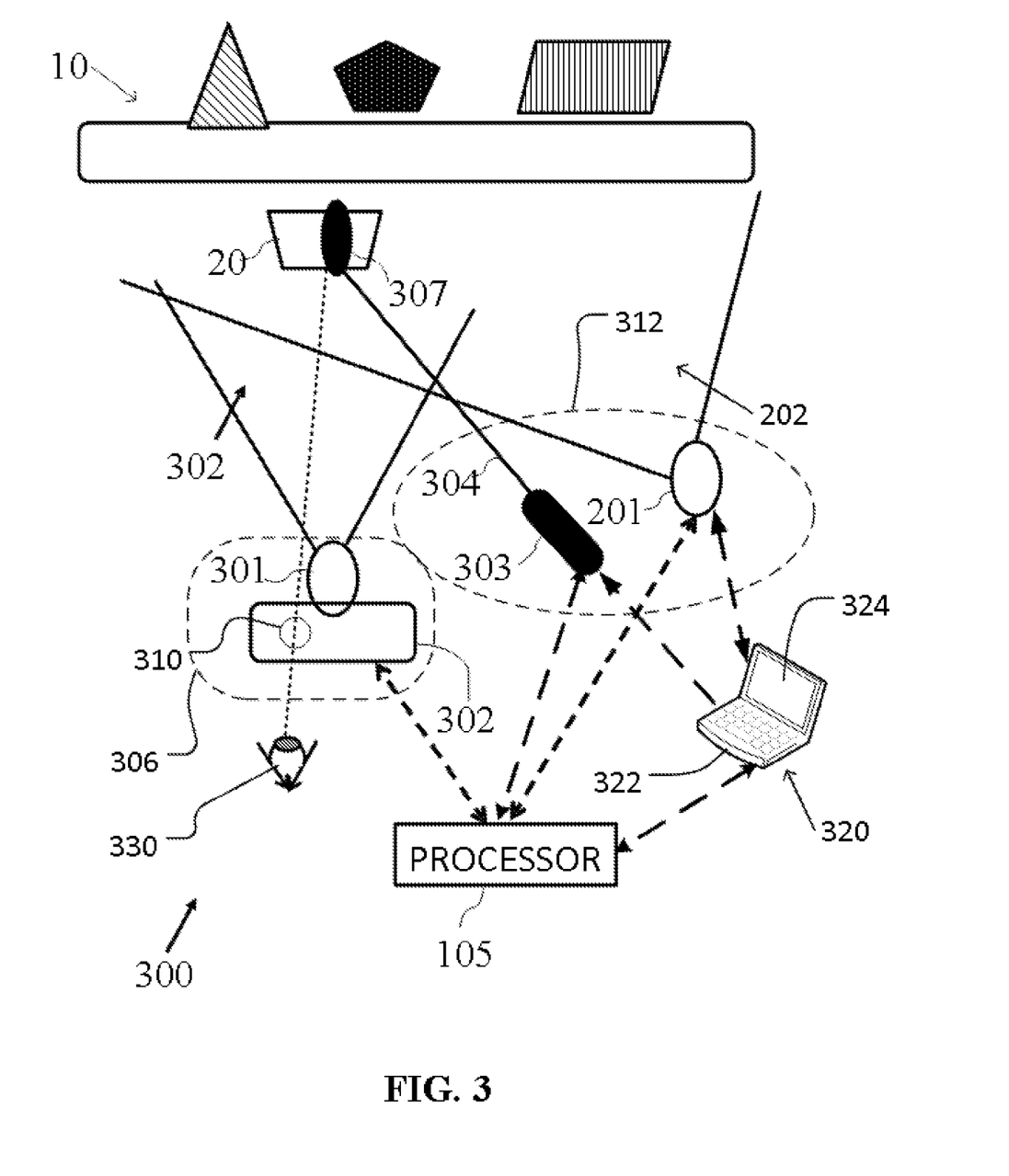
FIG. 3 schematically illustrates a multi-layer viewing system, in accordance with an embodiment of the present invention.

FIG. 3 schematically illustrates a multi-layer viewing system, in accordance with an embodiment of the present invention.

Typically, multi-layer system 300 includes a headset 306 for wearing by a local user (e.g., a user who may directly view, and in some cases come into physical contact with so as to touch, handle, or manipulate at least part of target object 10) and remote station 320 for operation by a remote user. The remote user may be at a location that is physically remote from target object 10, may be a user who is near target object 10 but who does wear headset 306 or may be identical to the local user.

Remote station 320 typically includes user controls 322 and remote display 324. For example, user controls 322 may be operated by the remote user to control operation of one or more of stationary imager 201, beam projector 303, augmented reality scene imager 301, and augmented reality display 302. Remote display 324 may be used to display images from one or more of stationary imager 201, augmented reality scene imager 301, or one or more other sources (e.g., images or other documentation related to target object 10 that are retrieved from a data storage device associated with processor 105, or from another source that is accessible to the remote user). A remote user who is viewing an acquired image of target object 10 on remote display 324 may operate user controls 322 to indicate a target location 20 on the displayed image to cause beam projector 303 to project a physical layer marking 307 to the indicated location. A remote user who is viewing an acquired image of target object 10 on remote display 324 may operate user controls 322 to indicate a selected location on the displayed image to cause augmented reality display 302 to display annotation 310 at the selected location. For example, augmented reality display 302 may include a projector that is configured to project annotation on a semitransparent see-through component of augmented reality display 302, or may be otherwise configured (e.g., with a liquid crystal display or otherwise) to display annotation 310 on augmented reality display 302.

In multi-layer system 300, a target region 20 of target object 10 may be marked with physical layer marking 307 with a projected beam 304 that is projected by beam projector 303 (which may be identical or similar to second directional illumination source 203 in FIG. 2B). For example, operation of beam projector 303 may be controlled by processor 105 either automatically in accordance with programmed instructions, or in response to controls that are operated by a user (e.g., a remote user) of multi-layer system 300.

In some cases, beam projector 303 may be part of a single stationary unit 312 that includes stationary imager 201 (e.g., independently movable or rotatable but mounted on a single stand). In some cases, multi-layer system 300 may include two or more stationary units 312, e.g., located at additional stationary or movable locations. For example, an additional stationary unit 312 may be worn by the local user or another person, e.g., on a shoulder or torso. In some cases, beam projector 303 and stationary imager 201 may be separate units that may be placed independently of one another). In some cases, beam projector 303 may be provided with an optical system of one or more mirrors, lenses, prisms, or other elements that are moveable or rotatable by actuators to control the direction of projected beam 304. Beam projector 303 may include a laser source or another source for emitting projected beam 304 (e.g., a diffuse source with collimating optics). Beam projector 303 may include a pico-projector or mini-projector that may be operated to move projected beam 304 in a raster pattern or other pattern so as to project physical layer marking 307 in the form of an outline, diagram, symbol, alphanumeric character, or other pattern on target object 10.

In addition, processor 105 of multi-layer system 300 may be configured to display annotation 310 on augmented reality display 302. Typically, augmented reality display 302 is incorporated into a headset 306 that may be worn by a local user of multi-layer system 300. Goggles of headset 306 may be sufficiently transparent (or semitransparent) to enable the local user to directly view target object 10, including target region 20 and physical layer marking 307 via augmented reality display 302. Augmented reality display 302 includes a projector or other component that is configured to project or otherwise display annotation 310 onto the goggles. Thus, the local user may view annotation 310 that is displayed on augmented reality display 302 as superimposed or overlaid on the direct view of target object 10. Annotation may include alphanumeric characters, symbols (e.g., arrows or other symbols), outlines, drawings or figures, highlighting (e.g., tinting of a region that covers an area of interest), or other annotation.

Processor 105 may include one or more separate processing units, such as computers or processing circuitry. Some or all of the separate processing units may be configured to intercommunicate, e.g., via wired (electrical or optical cable) or wireless communications channels. In some cases, one or more of the separate processing units may be configured to operate autonomously and independently of the other processing units. For example, headset 306 may include a processing unit that is configured or dedicated to controlling augmented reality display 302 of headset 306. Stationary unit 312 may include a processing unit (e.g., processing circuitry) to facilitate coordination (e.g., closed loop coordination) between operation of stationary imager 201 and beam projector 303 (e.g., to ensure projection of physical layer marking 307 at the correct target region as identified on an image acquired by stationary imager 201).

In some cases, headset 306 may include audio speakers or headphones, a pointing device beam that indicates an orientation of headset 306, or other components (e.g., part or all of processor 105, power supply, or other components). In some cases, headset 306 may include a back-facing camera that is configured to image eye 330 so as to assist in calculation of a gaze direction of eye 330 (typically to be understood as representing both eyes) of the local user.

Typically, headset 306 may also include at least one augmented reality scene imager 301 that is configured to acquire images of a scene that is in front of headset 306 and augmented reality display 302. Augmented reality scene imager 301 may be fixed relative to augmented reality display 302. Typically, augmented reality scene imager 301 may be oriented and adjusted (e.g., with an appropriate lens focal length) such that field of view 302 of augmented reality scene imager 301 coincides at least approximately with what is viewed by the local viewer via (e.g., the goggles of) augmented reality display 302. When the head of the local user is turned or otherwise moved, augmented reality scene imager 301 may thus move in tandem with augmented reality display 302.

Alternatively or in addition to augmented reality scene imager 301, headset 306 may include a headset beam projector (e.g., illumination source 103 as shown in FIG. 1—not shown in FIG. 3 for clarity) that is configured to project a beam (e.g., beam 104) that is indicative of an orientation of headset 306.

Annotation 310 may relate to a particular part or region of target object 10. For example, annotation 310 may assist in identifying a part or region, may provide guidance to the local in manipulating or in performing an operation on the part or region, or may otherwise relate to the part or region. Accordingly, processor 105 may be configured to align annotation 310 as displayed by augmented reality display 302 with a scene that is currently viewed by eye 330 of the local user.

Field of view 202 of stationary imager 201 may be adjusted (e.g., oriented, zoomed, or both) by the local user or by a remote user so as to acquire images of target object 10. Typically, field of view 202 of stationary imager 201 is sufficiently large to fully cover the region of space that includes at least the region of target object 10 that may be marked by beam projector 303. In some cases, field of view 202 may be wider than field of view 302 of augmented reality scene imager 301. A remote user at remote station 320 of multi-layer system 300 may view on remote display 324 an image of target object 10 that is acquired by stationary imager 201. The remote user may then operate user controls 322 to indicate on the image a selected location that is to be marked by physical layer marking 307. The remote user may also operate user controls 322 to indicate content of annotation 310 that is to be displayed on augmented reality display 302.

Processor 105 may be configured to receive the indication of the selected location and content of annotation 310. Processor 105 may be configured to analyze images of target object 10 that are acquired by each of stationary imager 201 and augmented reality scene imager 301 and to identify images of one or more physical layer markings 307 in each of the acquired images.

In the example as schematically shown in FIG. 3, annotation 310 is to be viewed by eye 330 as superimposed on physical layer marking 307. In this case, processor 105 may analyze an image that is acquired by augmented reality scene imager 301 (or a beam that is projected by a headset-mounted beam projector) to determine an orientation of headset 306 relative to target object 10 and to physical layer marking 307. For example, it may be assumed that eye 330 is looking directly at physical layer marking 307. If the orientation of headset 306 is not directly toward physical layer marking 307, it may be assumed that the angular deviation of headset 306 from the direction of physical layer marking 307 may be equal to a rotation of eye 330 away from direction faced by headset 306. Using this information, annotation 310 may be displayed on augmented reality display 302 at a location calculated to lie on a straight line connecting eye 330 and physical layer marking 307.

In some cases, operation of augmented reality display 302 to display annotation 310 may be preceded by an alignment calibration procedure.

For example, the local user may be requested to face (e.g., turn headset 306 toward) a projected physical layer marking 307 while eye 330 is facing straight ahead toward physical layer marking 307. An annotation 310 may then be displayed on augmented reality display 302. A location of annotation 310 on augmented reality display 302 may be adjusted (e.g., by a control operated by the local user, or by a remote user who is in communication with the local user) until the local user reports that annotation 310 appears to be superimposed on physical layer marking 307. In this way, a baseline alignment between eye 330 and augmented reality display 302 may be established.

As another example of an alignment calibration procedure, multiple physical layer markings 307 may be projected concurrently (e.g., with differently colored or shaped projected beams 304), or sequentially in a sequence that is coordinated with image acquisition by stationary imager 201 and augmented reality scene imager 301. The local user may be asked to look at one or more of these projected physical layer markings 307. Processor 105 may utilize the identified physical layer markings 307 as viewed by augmented reality scene imager 301 to identify coordinates in a coordinate system that is stationary relative to target object 10 (e.g., a global or local coordinate system). In some cases, processor 105 may utilize a plan or digital description of surfaces (e.g., a three-dimensional model) of a known target object 10 to identify three-dimensional coordinates of physical layer markings 307. In some cases, processor 105 may utilize sequentially acquired images of a physical layer marking 307 that is scanned at a known rate over a surface (e.g., of known curvature) of target object 10 to calculate a tilt angle of the surface onto which physical layer marking 307 is projected, and thus calculate a relative distance between an imager (stationary imager 201 or augmented reality scene imager 301) and physical layer marking 307 (thus providing a third dimension in addition to the two dimensions that may be derived by (pixel) coordinates of the image of physical layer marking 307 in the acquired images).

For example, the stationary coordinate system may be based on images that are acquired by one or more stationary imagers 201. When a selected location for an annotation 310 is indicated by the remote user (e.g., on a displayed image of target object 10), that annotation 310 (e.g., with content that is input by the remote user) may be displayed by augmented reality display 302 at a location relative to target object 10 that is determined in accordance with the stationary coordinate system. Thus, annotation 310 may be perceived by the local user as displayed on augmented reality display 302 at the selected location relative to target object 10 that was indicated, e.g., by the remote user.

Registration of annotation 310 with target object 10 in multi-layer system 300 may be more accurate and simpler than registration in a system that lacks physical layer marking. In a system lacking physical layer marking, alignment of annotation with the target object may be based on a viewing direction of the augmented reality display only, e.g., based on comparing a field of view of a headset-mounted imager with that of a stationary imager. In such a case, where the direction of the local user's gaze does not coincide with the pointing direction of the headset-mounted imager (e.g., headset pointed to the right with the user's eyes are turned to the left), the annotation may not be perceived at the correct position relative to the target object (e.g., too far to the right).

Some augmented reality goggles are provided with a pupil position sensor (e.g., a camera facing the wearer's eyes) to detect pupil position relative to the goggles. Combining detection of physical layer marking 307 by augmented reality scene imager 301 with data from the pupil position sensor may enable accurate positioning of annotation 310 with better precision and with simpler (or faster) algorithms than would be possible using only the pupil position sensor.

The improved registration of annotation 310 that is enabled by multi-layer system 300 may enable annotation 310 to outline or highlight one or more components of target object 10 while avoiding any obscuration or nearby features. (In a typical augmented reality system, a component synthetic image would be displayed above or next to the viewed component, or by outlining or highlighting the component is such an image.)

Multi-layer system 300 may be configured to facilitate positioning of beam projector 303 so as to enable placement of physical layer marking 307 on all areas of interest of target object 10.

For example, physical layer marking 307 may be scanned automatically over the surface of target object 10 in a predetermined pattern, such as a raster pattern. While scanning, successive images of physical layer marking 307 that are acquired by stationary imager 201 and by augmented reality scene imager 301 may detect positions on target object 10 to which projected beam 304 cannot reach (e.g., due to shadowing by other components of target object 10 or by other objects in the vicinity). Similarly, processor 105 may detect regions of target object 10 that are visible to one of stationary imager 201 and augmented reality scene imager 301, but not to the other. Automatic identification of such regions may facilitate repositioning of one or more of stationary imager 201 and target object 10 to eliminate or reduce the occurrence of such regions (or "blind spots").

In a case where occurrence of such regions ("blind spots") is unavoidable (e.g., due to the three-dimensional structure of target object 10 or due to the presence of obstacles or walls), an additional beam projector, stationary imager, or stationary unit (e.g., in addition to beam projector 303, stationary imager 201, or stationary unit 312) may be provided. Processor 105 may be configured to assist in positioning the additional components so as to be able to view or to apply physical layer marking 307 to parts of target object 10 that are not visible by stationary imager 201 or reachable by projected beam 304 of beam projector 303.

Processor 105 may be configured to automatically switch between the different stationary imagers or beam projectors as required to enable projecting of physical layer marking 307 on regions of target object 10. Such switching capability may also enable continued application of physical layer marking 307 in cases where one projected beam 304 is (temporarily) blocked, e.g., by insertion of a tool or object, by manipulation by the local user, by reshaping of target object 10 (e.g., by opening or closing a cover, removal or addition of a part, or otherwise), or under other circumstances.

In some cases where projected beam 304, annotation 310 by augmented reality display 302 may be substituted for physical layer marking 307.

Since, typically, beam projector 303 is mounted in a stable manner, physical layer marking 307 may be more precise than typical augmented reality marking of a three-dimensional surface. During initial scanning of physical layer marking 307 over the surface of target object 10, a map of target object 10 may be created that correlates a tilt angle of each region of the surface of target object 10 with a position of the region (e.g., by comparing an imaged scan speed of physical layer marking 307 with an actual scan rate of projected beam 304, or otherwise). Detailed knowledge of the surface of target object 10 may enable accurate positioning of physical layer marking 307.

Figure 4:
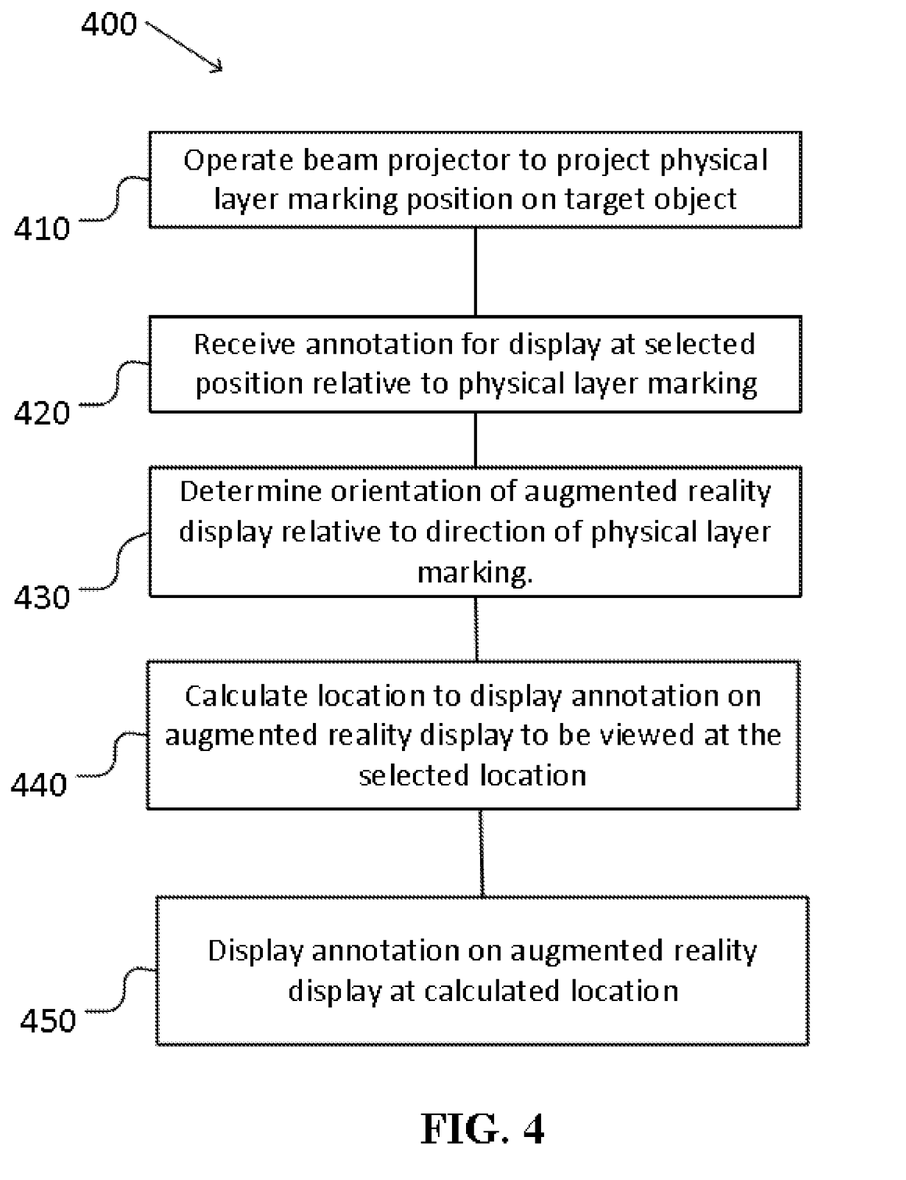
FIG. 4 is a flowchart depicting a method of operation of a multi-layer viewing system, in accordance with an embodiment of the present invention.

FIG. 4 is a flowchart depicting a method of operation of a multi-layer viewing system, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Multi-layer operation method 400 may be executed by processor 105 of multi-layer system 300, e.g., in response to a request by a remote user to display annotation 310 on augmented reality display 302.

Execution of multi-layer operation method 400 may be preceded by an initial registration calibration procedure. Typically, the initial registration calibration procedure may include projection of one or more physical layer markings 307 on target object 10, and requesting one or more responses or actions by the local user who is wearing headset 306. For example, such responses may include facing and looking at physical layer marking 307, assisting in aligning an annotation 310 with a physical layer marking 307, or other actions. The initial registration calibration procedure may be performed when a local user is wearing headset 306 and is in position to begin work on target object 10. In some cases, the initial registration calibration procedure may be repeated, e.g., when headset 306 has been removed from the head of the local user and replaced, or when headset 306 has slipped or has otherwise been moved on the head of the local user, or in other circumstances.

Beam projector 303 may be operated to project one or more physical layer markings 307 onto target object 10 (block 410). The projected physical layer markings 307 may be projected onto target object 10 at a target region 20 of target object 10. For example, a remote user at remote station may operate a user control 322 to control a direction of a projected beam 304.

Instructions may be received (e.g., from remote station 320) to display annotation 310 at a selected location relative to target region 20 or physical layer marking 307 (block 420). For example, the remote user may view target object 10 on remote display 324 that is displaying an image of target object 10 and physical layer marking 307 that was acquired by stationary imager 201. The remote user may operate user controls 322 to mark a location on the displayed image (e.g., at or near physical layer marking 307 at which annotation 310 is to be displayed, and may enter content of annotation 310.

An orientation of augmented reality display 302 may be determined (block 430). For example, an image of target object 10 and one or more physical layer markings 307 (e.g., displayed concurrently or sequentially) may be acquired by augmented reality scene imager 301. Processor 105 may then apply image processing techniques to determine a direction toward which headset 306 is facing. As another example, an image of target object 10 and a physical layer marking 307, together with a marking that is formed by a beam 104 that is emitted by a directional illumination source 103 that is incorporated into or coupled to headset 306, may be acquired by stationary imager 201. The relative locations of the two imaged beams may be indicative of the orientation of augmented reality display 302 relative to physical layer marking 307.

Processor 105 may calculate, e.g., on the basis of an initial registration calibration procedure or otherwise, a display location for displaying annotation 310 on augmented reality display 302 such that eye 330 of the local user who is viewing augmented reality display 302 may perceive annotation 310 as displayed at the selected location relative to target object 10 (block 440). For example, processor 105 may analyze acquired images to calculate an angular deviation between the facing direction of headset 306 and the actual direction toward physical layer marking 307, and to calculate a location for display annotation 310 on augmented reality display 302 such that eye 330 is expected to view annotation 310 as superimposed on target object 10 at the selected location relative to target object 10 or physical layer marking 307.

Processor 105 may then cause augmented reality display 302 to display annotation 310 at the calculated display position to be perceived at the indicated position relative to the image of physical layer marking 307 (block 450).

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A multi-layer viewing system comprising:
   a stationary imager configured to acquire images with a field of view that comprises a target object;
   a beam projector controllable to project one or more physical layer markings onto a target region of the target object;
   a headset separate from the stationary imager and from the beam projector, the headset comprising an augmented reality display being sufficiently transparent to enable a local user who is wearing the headset to directly view the target object through the augmented reality display and configured to display an annotation that is superimposed on the directly viewed target object so as to be visible to the local user, the headset further comprising:
   a scene imager configured to acquire scene images of a region in front of the augmented reality display, or
   a headset beam projector configured to project a headset beam in front of the augmented reality display; and
   a processor, configured to:
   receive a selected location relative to the target region for display of the annotation;
   determine an orientation of the augmented reality display based on locations of images of of said one or more physical layer markings in the scene images, or based on the location, in an image acquired by the stationary imager, of an image of a mark that is formed by the headset beam relative to said one or more physical layer markings;
   calculate a display location for displaying the annotation on the augmented reality display such that the annotation is perceivable by the local user as displayed at the selected position relative to the target region; and
   display the annotation on the augmented reality display at the calculated display location.

2. The multi-layer viewing system of claim 1, wherein the beam projector is controllable by operation of a user control.

3. The multi-layer viewing system of claim 2, wherein the user control enables a remote user to control the beam projector by indication of the target region on an image of the target object that is acquired by the stationary imager.

4. The multi-layer viewing system of claim 1, wherein a user control is configured to enable input of the selected location by indication of the selected location on an image of the target object that is acquired by the stationary imager.

5. The multi-layer viewing system of claim 1, wherein the beam projector comprises a laser.

6. The multi-layer viewing system of claim 1, wherein the beam projector is configured to project a physical layer marking in the form of a pattern.

7. The multi-layer viewing system of claim 1, wherein a field of view of the stationary imager is sufficiently large to fully cover at least a region of target object onto which a physical layer marking may be projected by the beam projector.

8. The multi-layer viewing system of claim 1, wherein the beam projector is further configured to scan said one or more physical layer markings over a surface of the target object.

9. The multi-layer viewing system of claim 8, wherein the processor is further configured to calculate a tilt angle of the surface.

10. The multi-layer viewing system of claim 1, further comprising a remote station.

11. The multi-layer viewing system of claim 10, wherein the remote station comprises a remote display and user controls.

12. The multi-layer viewing system of claim 1, wherein the stationary imager and the beam projector are incorporated into a single stationary unit.

13. The multi-layer viewing system of claim 1, further comprising at least one additional imager or at least one additional projector.

14. The multi-layer viewing system of claim 13, wherein the processor is further configured to operate said at least one additional imager to acquire an image of a region of the target object that is identified as not visible to the stationary imager, or to operate said at least one additional projector to project a marking on a region of the target object that is identified as not accessible to a beam that is emitted by the beam projector.

15. A method of operation of a viewing system that includes a stationary imager, a beam projector, and a headset separate from the stationary imager and from the beam projector, the headset comprising an augmented reality display being sufficiently transparent to enable a local user who is wearing the headset to directly view the target object through the augmented reality display and configured to display an annotation that is visible superimposed on the directly viewed target object, the headset further comprising:
  a scene imager configured to acquire scene images of a region in front of the augmented reality display, or
  a headset beam projector configured to project a headset beam in front of the augmented reality display,
the method comprising:
  acquiring:
  using the scene imager, a scene image of the target object when one or more physical layer markings are projected onto a target region of the target object by the beam projector, or
  using the stationary imager, an image that includes said one or more physical layer markings and a mark that is formed by the headset beam;
  receiving a selected location relative to the target region for display of the annotation;
  determining an orientation of the augmented reality display based on locations, in the acquired scene image, of an image of said one or more physical layer markings, or based on the location, in an image acquired by the stationary imager, of a mark that is formed by the headset beam relative to an image of said one or more physical layer markings;
  calculating a display location for displaying the annotation on the augmented reality display such that the annotation is perceivable by the local user as displayed at the selected position relative to the target region; and
  displaying the annotation on the augmented reality display at the calculated display location.

16. The method of claim 15, wherein acquiring the scene image of the target object comprises acquiring a plurality of the scene images successively when a physical layer marking of said one or more physical layer markings is scanned across a surface of the target object.

17. The method of claim 16, further comprising calculating a tilt angle of the surface by identifying a location of the image of the scanned physical layer marking within the successively acquired scene images.

18. The method of claim 15, wherein acquiring using the scene imager is preceded by execution of a registration calibration procedure.

19. The method of claim 18, wherein the registration calibration procedure comprises operating the beam projector to project one or more calibration physical layer markings onto the target object.

20. The method of claim 19, wherein the registration calibration procedure further includes displaying calibration annotation on the augmented reality display such that the annotation is visible to a user of the headset who is looking at a marking of said one or more calibration physical layer markings as superimposed on that marking.

* * * * *